United States Patent [19]
Tabuchi

[11] Patent Number: 5,959,282
[45] Date of Patent: Sep. 28, 1999

[54] ENHANCED ERROR HANDLING APPARATUS, METHOD, AND PROGRAM PRODUCT FOR BARCODE READERS

[75] Inventor: Ichiro Tabuchi, Osaka, Japan

[73] Assignee: Keyence Corporation, Osaka, Japan

[21] Appl. No.: 08/631,232

[22] Filed: Apr. 12, 1996

[30]     Foreign Application Priority Data

Apr. 13, 1995  [JP]  Japan ................................. 7-088314

[51] Int. Cl.⁶ ...................................................... G06K 7/10
[52] U.S. Cl. ........................................... 235/462; 235/454
[58] Field of Search ................................... 235/462, 472, 235/463, 466, 454

[56]             References Cited

U.S. PATENT DOCUMENTS 4,263,504  4/1981  Thomas ................................... 235/454
5,262,626  11/1993  Goren et al. ............................. 235/462

*Primary Examiner*—Donald Hajec
*Assistant Examiner*—Karl Frech
*Attorney, Agent, or Firm*—Sughrue, Mion, Zinn, Macpeak & Seas, PLLC

[57]                ABSTRACT

When a decoding unit 6 fails in reading bar code information, a control unit 5 writes a corresponding error code into a ring table in the storage unit 4. In an error analyzing mode, the control unit 5 causes a measurement to automatically end when the decoding unit fails to read bar code information after the same bar code information is read a preset number of times or more, when the same bar code as that previously read is read and then bar code information different from that read by the preceding reading operation is read, or when a specific read error occurs. The indicator unit 7 indicates a number of the operations of reading bar code information and a read rate by changes of light colors emitted from light emission diodes of two colors, in a second normal measuring mode, and first and second test modes.

18 Claims, 15 Drawing Sheets

FIG. 5

| RING TABLE | |
|---|---|
| A0 | : |
| A1 | 0 |
| A2 | 6 |
| A3 | 0 |
| A4 | 1 |
| A5 | F |
| A6 | : |
| A7 | |
| Am | |

RING POINTER

| A7 |
|---|

ENHANCED ERROR HANDLING APPARATUS, METHOD, AND PROGRAM PRODUCT FOR BARCODE READERS

BACKGROUND OF THE INVENTION

The present invention relates to a bar code reading device for reading bar code information from a bar code.

The bar code reading device projects light onto a bar code, receives light reflected from the bar code, converts width information of the bar code into time information, converts the time information into numerical values, and sequentially stores the numerical values as binary data into a memory by a DMA (direct memory access) method, for example (data gathering process). After the bar code binary data of one scan is stored into the memory, the binary data that is stored in the memory is analyzed to read bar code information (decoding process).

Where a single memory area is used for storing the binary data, the data gathering process and the decoding process are alternately carried out for the memory area. Where a plural number of memory areas or a memory area that is divided into a plural number of segments is used for storing the binary data, the data gathering process and the decoding process are concurrently carried out. More specifically, the data gathering process is carried out for one memory area or one segment, while the decoding process is carried out for another memory area or another segment.

Such a reading operation is usually repeated till the same bar code information is read two times or till a command to forcibly end the measurement is issued. When the same bar code information is read two times, the read bar code information is outputted. When the same bar code information is not read two times at the end of the measurement, an error signal is outputted.

Thus, in the conventional bar code reading device, the same bar code information is read two times, and the read bar code information is outputted. Accordingly, where a read rate (the ratio of a number of successful readings to a number of actual reading operations) is high, the necessary bar code information can be gained through the first two reading operations. Where the read rate is low, many reading operations are required for gaining the same bar code information two times. In this case, it is impossible to know the reason why the read rate is low, although the bar code information can be gained.

Usually, the bar code reading device is designed so as to have a single function to read out bar code information. Further, there is a physical limit in the memory capacity of a memory used. Accordingly, every time the decoding process ends, the memory area is set free for the storage of the next binary data. For this reason, when the same bar code information is read out two times and the measurement normally ends, the binary data normally read out is stored in the memory area of the memory. If the measurement by the bar code reading device is forcibly ended at an arbitrary time point, the binary data read out at that time point is stored into the memory area of the memory.

The data left in the memory area of the memory at the end of the measurement is either of two types of binary data. Therefore, when the bar code information is not read out, it is impossible to subsequently verify the reason why the reading of the bar code information failed by analyzing the data left in the memory area of the memory.

A bar code verifying device which reads out a still bar code and carefully evaluates the bar code information of the bar code is used. The bar code verifying device is capable of inspecting a defective on the bar code, but cannot be used as a bar code reading device in production lines in a factory.

For this reason, it is inherently impossible to verify a defective occurring only in the bar code reading device actually used, and a read error occurring on the bar code being under measurement in the production line in a factory. Further, an error of the analog signal from the bar code reading device and an error in the optical system cannot be verified. In a case where three reading operations are performed but one of the reading operations fails, an operator cannot know the reason why the reading operation fails, and the fact that dust attaches to the bar code in the production line, for example.

Additionally, where the conventional bar code reading device is used, an operator cannot know reading states, such as a number of operations of reading the same bar code information and a read rate, during the measurement of the bar code.

SUMMARY OF THE INVENTION

Accordingly, an object of the present invention is to provide a bar code reading device which enables an operator to know the reason why the reading of bar code information fails at an arbitrary time point.

Another object of the present invention is to provide a bar code reading device in which, when a read error occurs during the operation of reading a bar code, the data can subsequently be analyzed.

Yet another object of the present invention is to provide a bar code reading device which provides a visual indication which enables an operator to easily recognize a reading state of the bar code information with a simple construction during the measurement of the bar code.

A bar code reading device of a first aspect of the present invention comprises a light projecting means, converting means, data storing means, analyzing means, a control means, error information storing means, and output means. The light projecting means projects light on a bar code to be read out. The converting means receives light reflected from the bar code that is illuminated with light projected from the light projecting means and converts the reflected light into binary data. The data storing means stores the binary data received from the converting means. The analyzing means analyzes the binary data that is stored in the data storing means, and reading bar code information. The control means controls the operation of reading out the bar code information by the light projecting means, the converting means, the data storing means, and the analyzing means. The error information storing means stores error information when the analyzing means fails in reading the bar code information. The output means outputs error information that is stored in the error information storing means.

A bar code reading device of a second aspect of the invention comprises a light projecting means, converting means, data storing means, analyzing means, a control means, a readout ending means, and output means. The light projecting means projects light on a bar code to be read out. The converting means receives light reflected from the bar code that is illuminated with light projected from the light projecting means and converts the reflected light into binary data. The data storing means stores the binary data received from the converting means. The analyzing means analyzes the binary data that is stored in the data storing means, and reading bar code information. The control means repeats the operation of reading out the bar code information by the light projecting means, the converting means, the data storing means, and the analyzing means. The readout ending means ends the operation of reading the bar code information when the result of the analysis by the analyzing means shows an error occurring state. The output means outputs the binary data that is stored in the data storing means at an arbitrary time after a measurement ends.

A bar code reading device of a third aspect of the invention is the bar code information of the second aspect which further comprises a setting means for presetting the error occurring state, and in which the preset readout ending means for ending the operation of reading the bar code information when the result of the analysis by the analyzing means shows the error occurring state set by the setting means.

A bar code reading device of a fourth aspect of the invention is the bar code information of the second aspect in which the preset error occurring state indicates such a state that the analyzing means fails in reading the bar code information after the bar code information is read a preset number of times or more.

A bar code reading device of a fifth aspect of the invention is the bar code information of the second aspect in which the preset error occurring state indicates such a state that bar code information currently read is different from the bar code information first read after the measurement started.

A bar code reading device of a sixth aspect of the invention is the bar code information of the second aspect in which the preset error occurring state is such a state that a given error occurs.

A bar code reading device of a seventh aspect of the invention comprises a light projecting means, converting means, data storing means, analyzing means, a control means, a totalizing means and output means. The light projecting means projects light on a bar code to be read out. The converting means receives light reflected from the bar code that is illuminated with light projected from the light projecting means and converts the reflected light into binary data. The data storing means stores the binary data received from the converting means. The analyzing means analyzes the binary data that is stored in the data storing means, and reading bar code information. The control means repeats the operation of reading out the bar code information by the light projecting means, the converting means, the data storing means, and the analyzing means. The totalizing means totalizes the bar code information read by the analyzing means. The indicating means indicates the result of the totalizing of the bar code information by the totalizing means with LED indicators each containing a plural number of light emitting elements of different colors.

A bar code reading device of an eighth aspect the invention is the bar code information of the seventh aspect in which the totalizing means totalizes ratios of the reading of bar code information to a preset number of the reading operations, and the indicating means indicates the ratio in the combination of "on" and "off" of the light emitting elements of different colors.

A bar code reading device of a ninth aspect of the invention is the bar code information of the seventh aspect in which the totalizing means totalizes the values indicative of the results each of adding up a number of the reading operations when the same bar code information as that previously read is read, and the indicating means indicates the values in the combination of "on" and "off" of the light emitting elements of different colors.

In the bar code information of the first to ninth aspects, light is projected onto a bar code to be read out, and the light reflected from the bar code is received and converted into binary data. The binary data is analyzed and bar code information thereof is read. The reading operation of the bar code information is repeated till a predetermined end condition is satisfied.

In the bar code reading device of the first aspect, when the analyzing means fails in reading bar code information, error information is stored into the error information storing means. By analyzing the error information that is stored in the error information storing means after the end of the measurement, one can know the reason for the failure of reading the bar code information, which includes a defective of the bar code reading device actually used and a defective of the bar code actually read out.

In the bar code reading devices of the second to the sixth aspects, when the result of the analysis by the analyzing means shows a predetermined error occurring state, the operation of reading the bar code information ends. Accordingly, one can know the reason for the failure of reading the bar code information by outputting the binary data that is stored in the data storing means at the end of the measurement, and analyzing the outputted data.

In the bar code information of the third aspect, a desired error occurring state can be set by the setting means. In the bar code reading device of the fourth aspect, when analyzing means fails in reading the bar code information after the bar code information is read a preset number of times or more, the reading operation ends. In the bar code reading device of the fifth aspect, when bar code information currently read is different from the bar code information first read after the measurement started, the reading operation ends. In the bar code reading device of the sixth aspect, when a given error occurs, the reading operation ends.

In the bar code reading devices of the seventh to the ninth aspects, the bar code information read by the analyzing means are totalized, and the result of the totalizing of the bar code information by the totalizing means is indicated with LED indicators each containing a plural number of light emitting elements of different colors. In this case, "on" and "off" of the light emitting elements of different colors of the LED indicators are combined to provide a greater number of light colors than the number of the LED indicators. Accordingly, during the measurement of the bar code, reading states of bar code information can be indicated in a plural number of steps of different colors. Since the reading states are indicated with different light colors, an operator can easily and instantaneously know a change of a reading state at a distance from the indicator unit during the measurement of the bar code.

In the bar code reading device of the eighth aspect, an operator can easily know a read rate by color changes of the LED indicators. In the bar code reading device of the ninth aspect, an operator can easily know a number of the operations of reading bar code information by color changes of the LED indicators.

BRIEF DESCRIPTION OF THE DRAWINGS

FIG. 5 shows the contents of a ring table and a ring pointer, used for the error code writing process of FIG. 4;

DETAILED DESCRIPTION OF THE PREFERRED EMBODIMENTS

Figure 1:
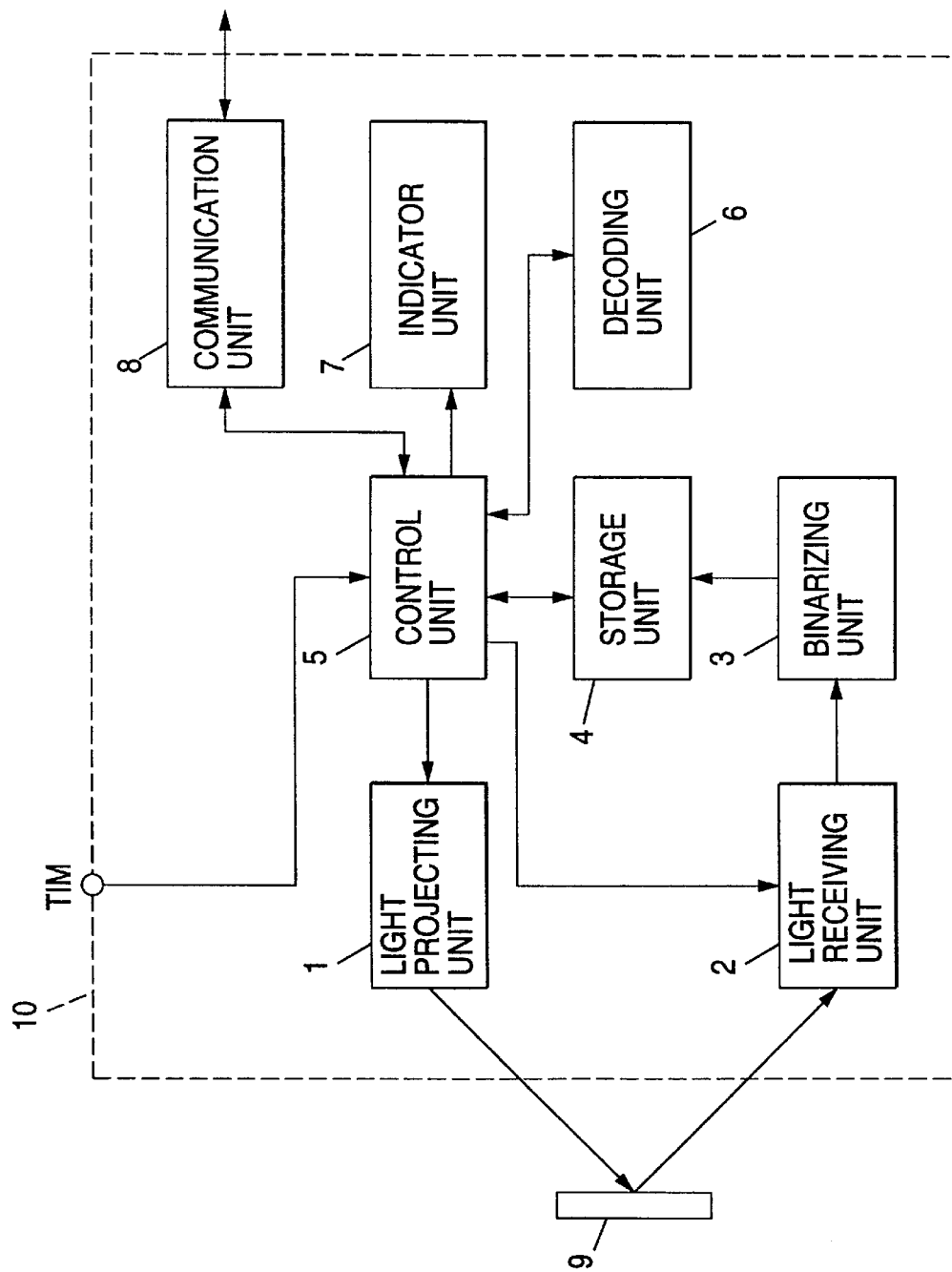
FIG. 1 shows an arrangement of a bar code reading device according to an embodiment of the present invention.

FIG. 1 is a block diagram showing an arrangement of a bar code reading device according to an embodiment of the present invention. A bar code reading device 10 shown in FIG. 1 comprises a light projecting unit 1, a light receiving unit 2, a binarizing unit 3, a storage unit 4, a control unit 5, a decoding unit 6, an indicator unit 7, and a communication unit 8.

The light projecting unit 1 includes a LED (light emitting diode) array, a LED drive circuit and a projection lens, and projects rays of light onto a bar code 9 as an object to be measured. In this case, the entire range of the bar code 9 from one end thereof to the other end are simultaneously illuminated with light projected from the LED array. The light receiving unit 2 includes a CCD (charge coupled device), an image sensor and a CCD drive circuit, and receives light reflected from the bar code 9 and transforms the received light into an electrical signal. In this case, the light receiving unit 2 simultaneously receives light reflected from the entire range of the bar code 9 from one end thereof to the other end.

The light projecting unit 1 may be constructed with a semiconductor laser element, a laser light-on circuit and a polygon mirror, while the light receiving unit 2 may be a photoelectric transforming element, e.g., a photo diode. In this case, the polygon mirror is rotated by a motor. A laser beam emitted from the semiconductor laser element is reflected on the surface of the polygon mirror being rotated. With the reflected laser beam, the bar code 9 is entirely scanned from one end thereof to the other end. The photoelectric transforming element successively receives the light beam reflected from one end of the bar code to the other end thereof, and transforms it into electrical signals.

In the description to follow, one scan means such a motion as to simultaneously or successively project light over the entire range of the bar code 9 from one end thereof to the other end, and to receive the light reflected from the bar code in a similar way.

The binarizing unit 3 receives the electrical signals from the light receiving unit 2, and counts width information of each of bars of the bar code 9 on the basis of (using) the reference clock signal, whereby the width information of the bar code are converted into time information. The binarizing unit 3 converts the time information into numerical information and outputs it in the form of binary data. The binary data produced from the binarizing unit 3 are successively stored into the storing unit 4 by a DMA (direct memory access) method, for example. The decoding unit 6 analyzes (decodes) the binary data of the storing unit 4, to thereby read bar code information.

The indicator unit 7 indicates the result of the operation of reading the bar code information by the decoding unit 6. The communication unit 8 receives various commands from an external device, and transfers them to the control unit 5. Further, it sends the results of the operation of reading the bar code information by the decoding unit 6 to the external device. The control unit 5 controls the related portions in the bar code reading device 10 on the basis of a timing signal TIM that is received from the external device, and commands received through the communication unit 8.

Figure 2:
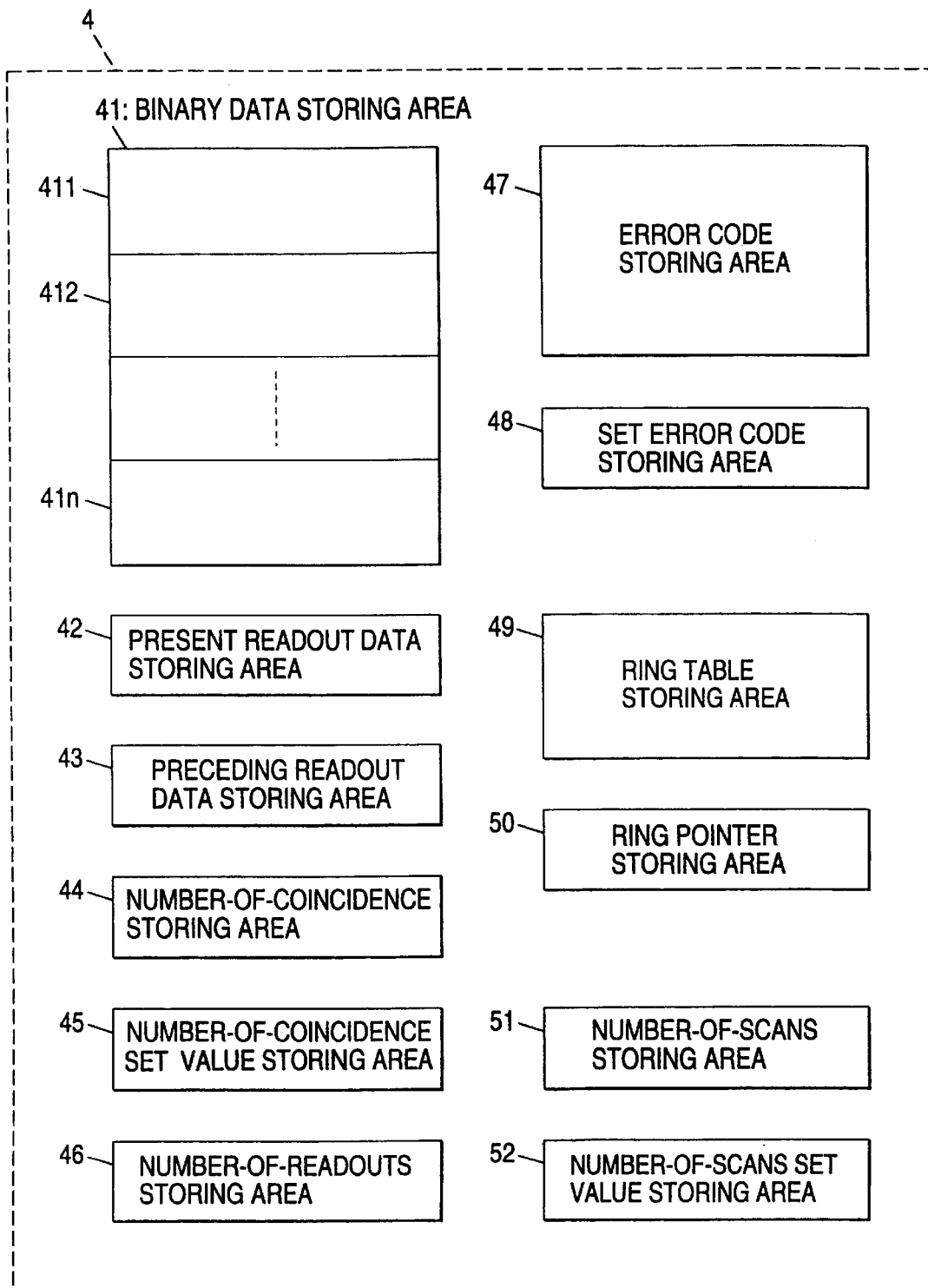
FIG. 2 shows a memory map of a storage unit in the bar code reading device of FIG. 1.

A memory map of the storing unit 4 is shown in FIG. 2. As shown in FIG. 2, the storing unit 4 includes a binary data storing area 41, a present readout data storing area 42, a preceding readout data storing area 43, a number-of-coincidences storing area 44, a number-of-coincidences set value storing area 45, and a number-of-readouts storing area 46. The storing unit 4 further includes an error code storing area 47, a set error code storing area 48, a ring table storing area 49, a ring pointer storing area 50, a number-of-scans storing area 51, and a number-of-scans set value storing area 52.

The binary data storing area 41 includes an n number of DMA memory areas 411, 412, ..., 41n. The binary data of one scan is stored into these memory areas by the DMA method, from the binarizing unit 3. After the analysis of the binary data by the decoding unit 6, the decoding unit 6 is set free for storing the subsequent binary data.

The present readout data storing area 42 follows. The bar code information gained through the present reading operation by the decoding unit 6 is stored as the present readout data into the present readout data storing area 42. The bar code information gained through the preceding reading operation by the decoding unit 6 is stored as the preceding readout data into the preceding readout data storing area 43. The number-of-coincidences storing area 44 is used in the following way. When the bar code information currently read out is the same as the bar code information read out in the preceding reading operation, a number of the reading operations is stored as a number of coincidences in the number-of-coincidences storing area 44. A set value of the number of coincidences is stored in advance into the number-of-coincidences set value storing area 45. A number of operations of reading bar code information by the decoding unit 6 is stored as a number of reading operations into the number-of-readouts storing area 46.

The error code storing area 47 stores various error codes in advance. The set error code storing area 48 stores specific error codes in advance. When the decoding unit 6 fails in reading bar code information, a corresponding error code is stored into the ring table storing area 49. The ring pointer storing area 50 is used for storing a ring pointer representative of a memory position of the ring table when an error code is written into the ring table. The present number of scans is stored into the number-of-scans storing area 51. A set value of the number of scans is stored in advance in the number-of-scans set value storing area 52.

In the present embodiment, the light projecting unit 1 forms a light projecting means. The light receiving unit 2 and the binarizing unit 3 form converting means. The binary data storing area 41 in the storage unit 4 forms a data storing means. The decoding unit 6 forms an analyzing means. The control unit 5 forms a control means, a readout ending means, and a totalizing means. The ring table storing area 49 and the ring pointer storing area 50 in the storage unit 4 form error information storing means. The indicator unit 7 forms an indication means. The communication unit 8 forms a setting means and an output means.

Figure 3:
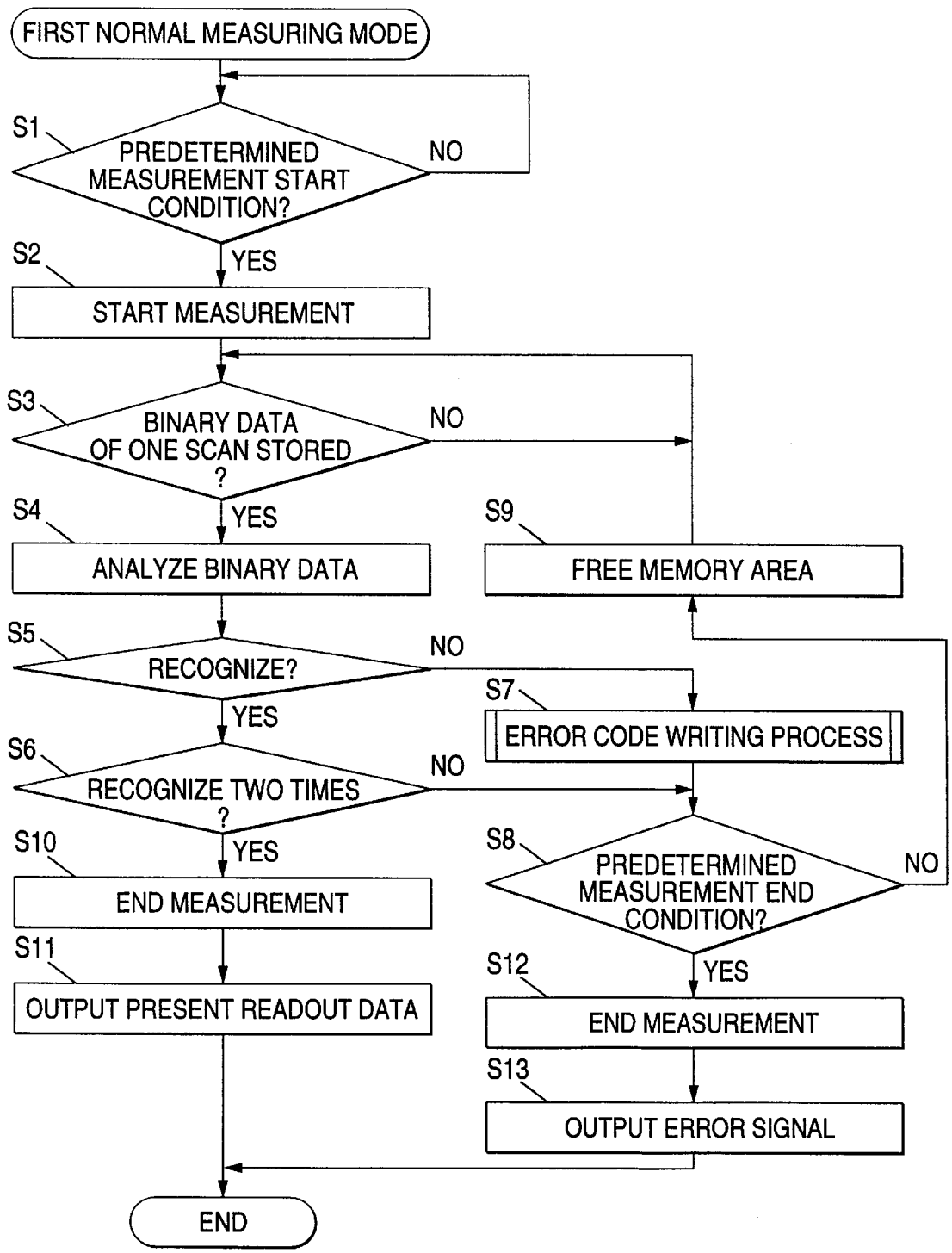
FIG. 3 is a flowchart showing a first normal measuring mode in the bar code reading device of FIG. 1.

A first normal measuring mode in the bar code reading device of the present embodiment will be described with reference to a flowchart shown in FIG. 3.

To start, the control unit 5 determines whether or not a predetermined measurement start condition is satisfied (step S1). The predetermined measurement start condition is to receive a mode designating command indicative of a first normal measuring mode through the communication unit 8 and to receive a timing signal TIM from exterior or to receive a measurement start command through the communication unit 8. If the measurement start condition is satisfied, a measurement starts (step S2). Upon the measurement start, the light projecting unit 1 projects light to the bar code 9, and the operation of storing the binary data into the binary data storing area 41 in the storage unit 4 by the DMA method, starts.

The control unit waits till the binary data of one scan is stored into the binary data storing area 41 (step S3). When the operation of storing the binary data of one scan is completed, the decoding unit 6 analyzes the binary data of the binary data storing area 41 and reads the bar code information thereof, and stores the read bar code information as the present readout data into the present readout data storing area 42 (step S4).

Next, the control unit 5 determines whether or not the decoding unit 6 has recognized bar code information (step S5). If the bar code information is recognized, the control unit determines whether or not the same bar code information is recognized two times (step S6). If the same bar code information is not recognized two times, the control unit determines whether or not a predetermined measurement end condition is satisfied (step S8).

If the bar code information is not recognized (step S5), the control unit carries out an error code writing process to be described later (step S7), and determines whether or not the predetermined measurement end condition is satisfied (step S8). Here, the predetermined measurement end condition is to receive no timing signal TIM from exterior or to receive a measurement end command through the communication unit 8.

When the measurement end condition is not satisfied, the control unit sets the memory area from which the decoding unit 6 has read the bar code information, free for the subsequent DMA operation (step S9), and returns to the step S3. For the memory area in the binary data storing area 41 into which the binary data has been stored by the DMA method, the storage of further binary data into the memory area is prohibited until the decoding unit 6 analyzes data (step S4) and the memory area is set free (step S9).

When the reading operation of the steps S3 to S9 is repeated and the decoding unit 6 has recognized the same bar code information two times (step S6), the measurement ends (step S10). Upon the end of the measurement, the projection of light by the light projecting unit 1 ends, and the operation of storing the binary data into the storage unit 4 by the DMA method ends. Thereafter, the present readout data that is stored in the present readout data storing area 42 of the storage unit 4 is outputted through the communication unit 8 (step S11).

If the measurement end condition is satisfied at a time point (step S8), the measurement ends (step S12) and an error signal is outputted through the communication unit 8 (step S13).

As described above, when the same bar code information is recognized two times, the measurement automatically ends, and the read bar code information is outputted as readout data. If the predetermined measurement end condition is satisfied, the measurement is forcibly ended and an error signal is outputted. During the process being carried out, if the decoding unit 6 fails in recognizing the bar code information, the error code writing process of the step S7 is carried out.

Figure 4:
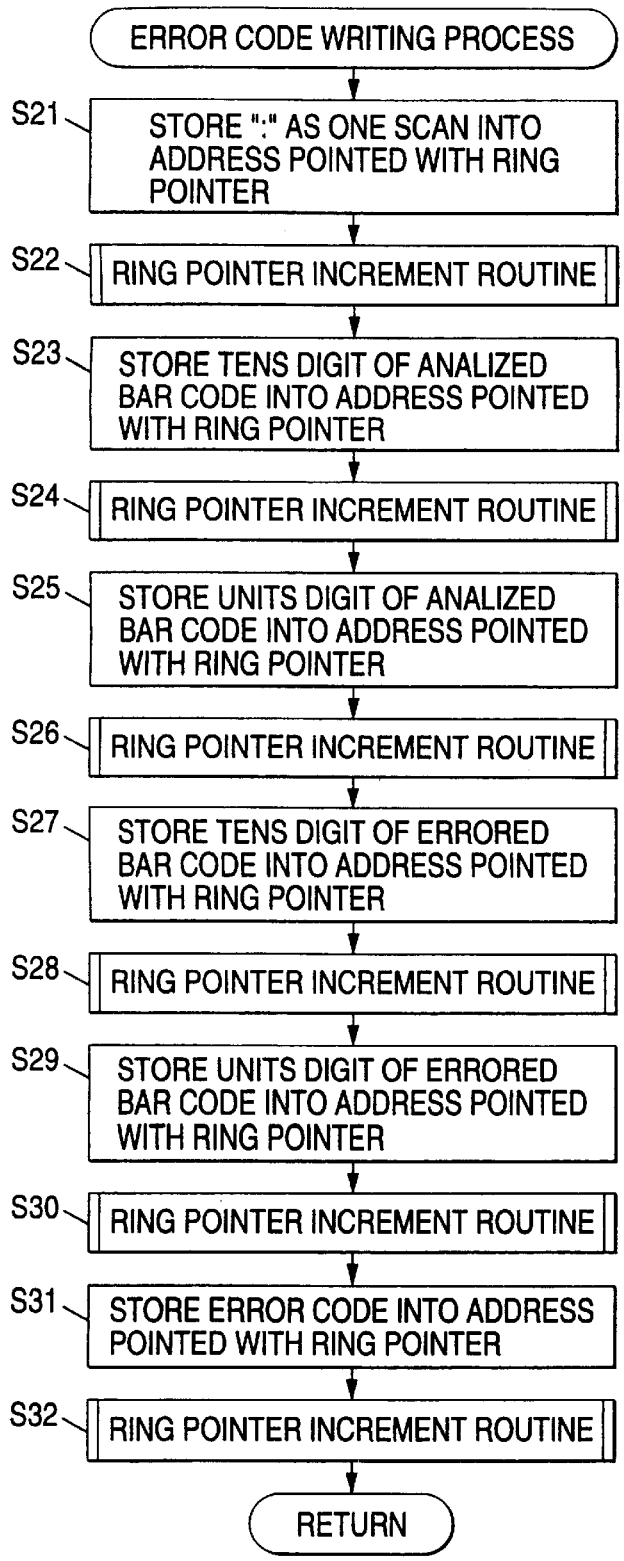
FIG. 4(a) is a flowchart showing an error code writing process in the bar code reading device of FIG. 1.
FIG. 4(b) is a flowchart showing a ring point increment routine in the bar code reading device of FIG. 1.
Figure 4:
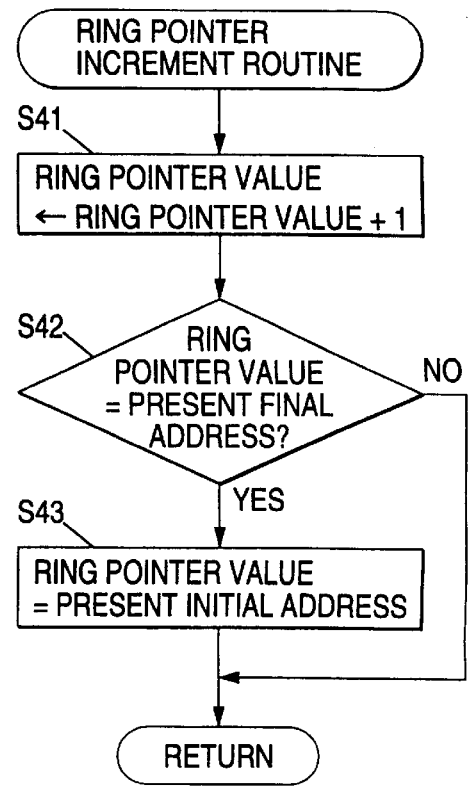

FIG. 4(a) is a flowchart showing an error code writing process, and FIG. 4(b) is a flowchart showing a ring pointer increment routine in the error code writing process. FIG. 5 is a diagram exemplarily showing the contents of a ring table and a ring pointer. The error code writing process will be described with reference to FIGS. 4 and 5.

When the decoding unit 6 fails in recognizing the bar code information, ":" is stored, as a mark for punctuating one scan, into an address location pointed with a ring pointer in a ring table (step S21 in FIG. 4(a)). The control unit executes the ring pointer increment routine shown in FIG. 4(b) (step S22), and then stores the tens digit in a number representative of the analyzed bar code into an address location pointed with a ring pointer in the ring table (step S23). After executing the ring point increment routine (step S24), the control unit stores the units digit in the number of the analyzed bar code into an address location pointed with the ring pointer in the ring table (step S25).

Further, after executing the ring point increment routine (step S26), the control unit stores the tens digit of a number representative of the bar code which suffers from an error during its analysis, into an address location pointed with a ring pointer in the ring table (step S27). After executing the ring point increment routine (step S28), the control unit stores the units digit in the number of the bar code which suffers from an error during its analysis, into an address location pointed with the ring pointer in the ring table (step S29).

Thereafter, the control unit executes the ring point increment routine (step S30), and stores an error code into an address location pointed with the ring pointer in the ring table (step S31).

In the ring point increment routine, the control unit increments by one the value of the ring pointer (step S41 in FIG. 4(b)), and determines whether or not the value of the ring pointer is coincident with a preset final address (step S42). If the value of the ring pointer is coincident with the final address, the control unit changes the value of the ring pointer to a preset initial address (step S43).

In the example shown in FIG. 5, ": 0 6 0 1 F :" are stored in the locations of addresses A0 to A6 in the ring table, and the value of the ring pointer is "A7". The example illustrated shows that a number of the analyzed bar code is a number of six ciphers, and an error represented by an error code "F" appears at the first digit.

Thus, when the decoding unit fails in reading the bar code information, an error code is written into the ring table.

Therefore, after the measurement ends, the reason why it failed to read the bar code information can be known from the ring table outputted through the communication unit 8.

Figure 6:
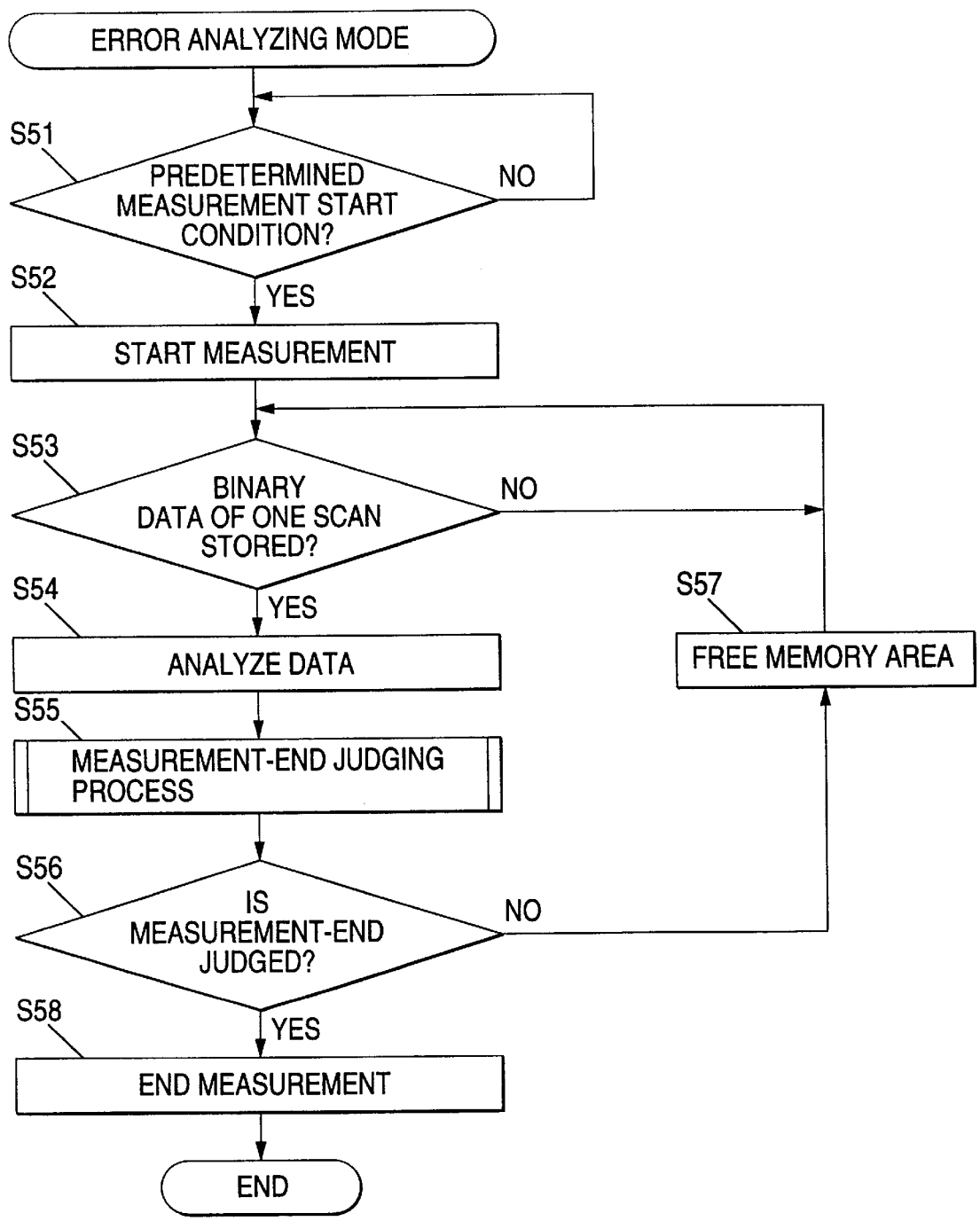
FIG. 6 is a flowchart showing an error analyzing mode in the bar code reading device of FIG. 1.
Figure 7:
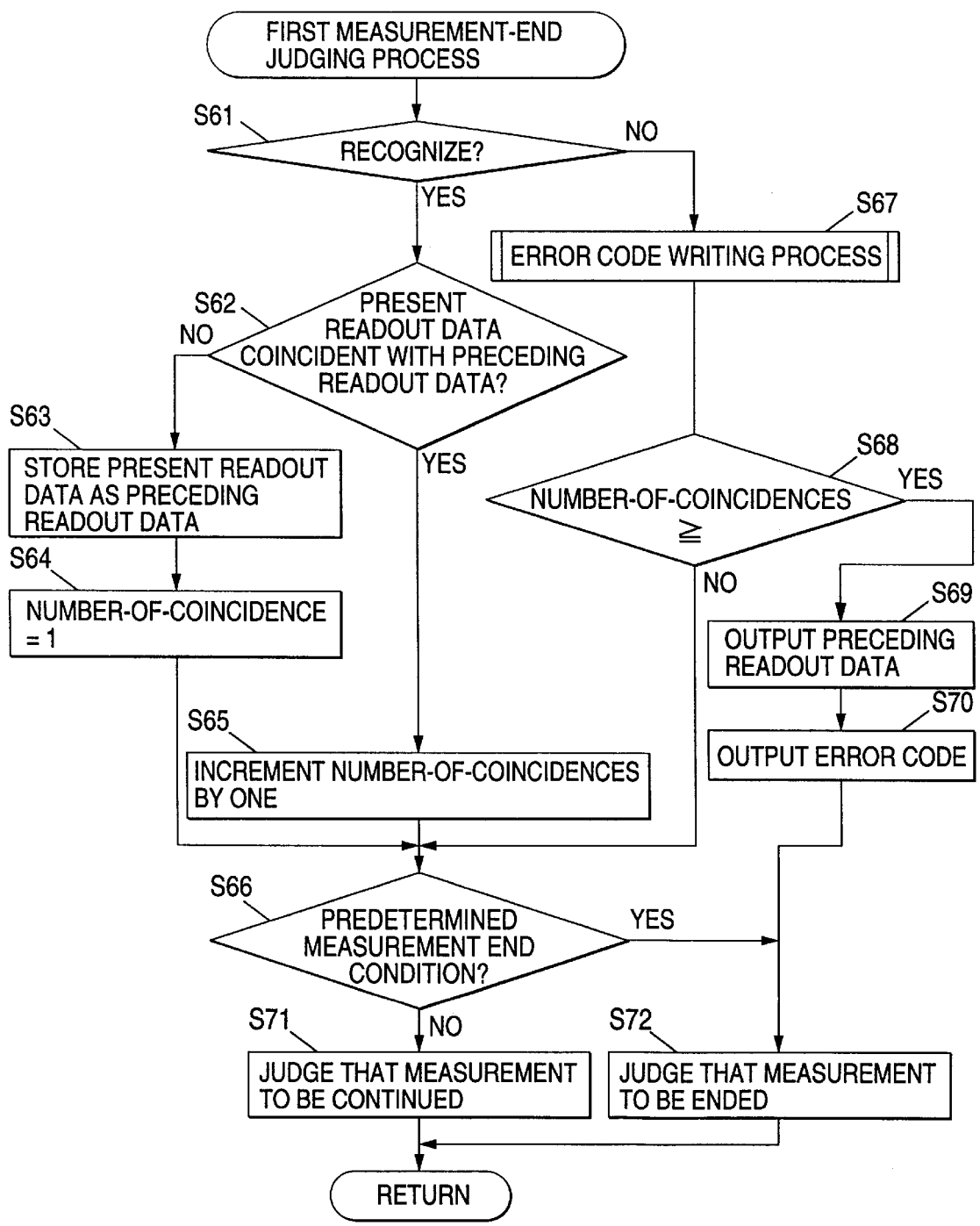
FIG. 7 is a flowchart showing a first measurement-end judging process in the error analyzing mode of FIG. 6.
Figure 8:
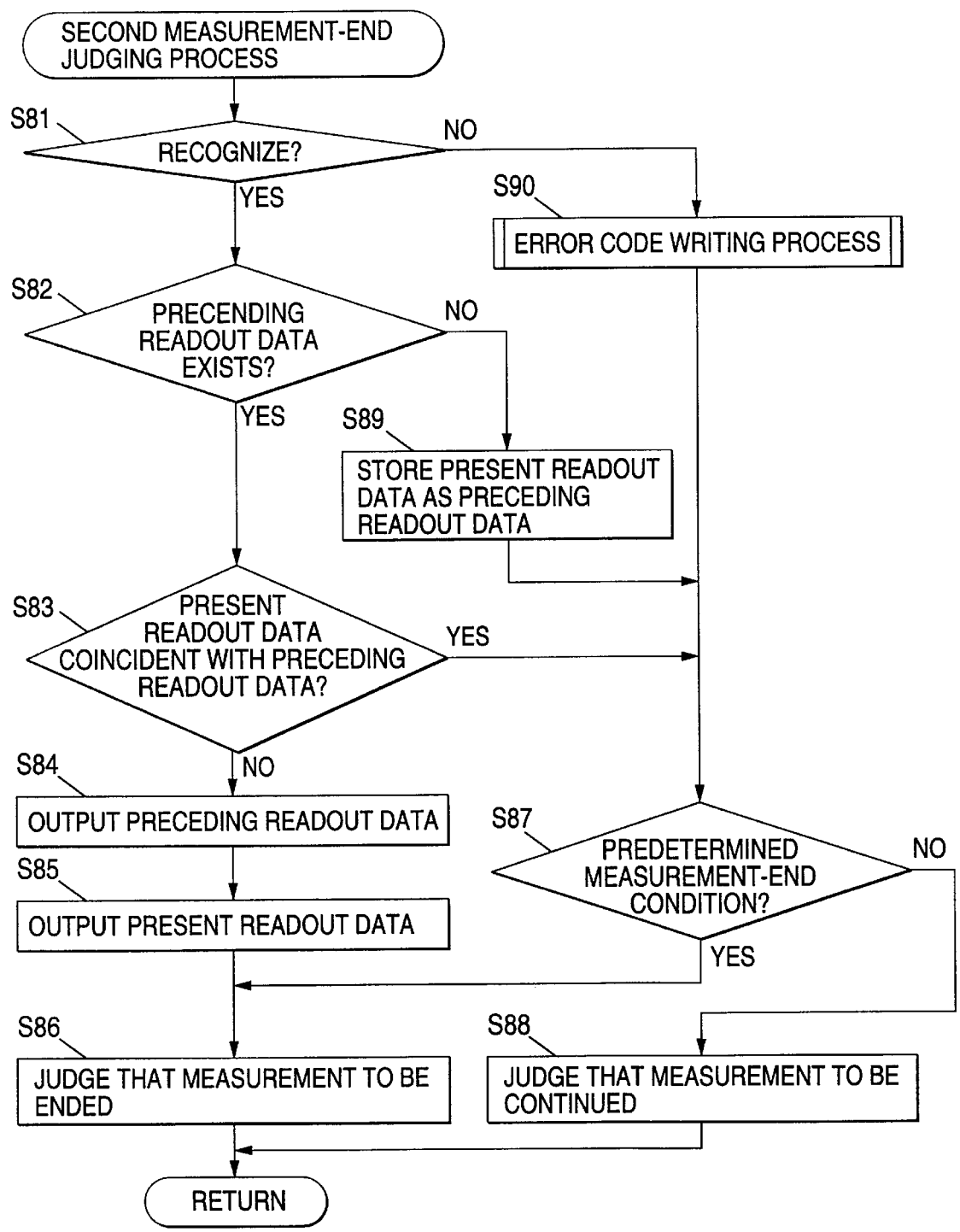
FIG. 8 is a flowchart showing a second measurement-end judging process in the error analyzing mode of FIG. 6.
Figure 9:
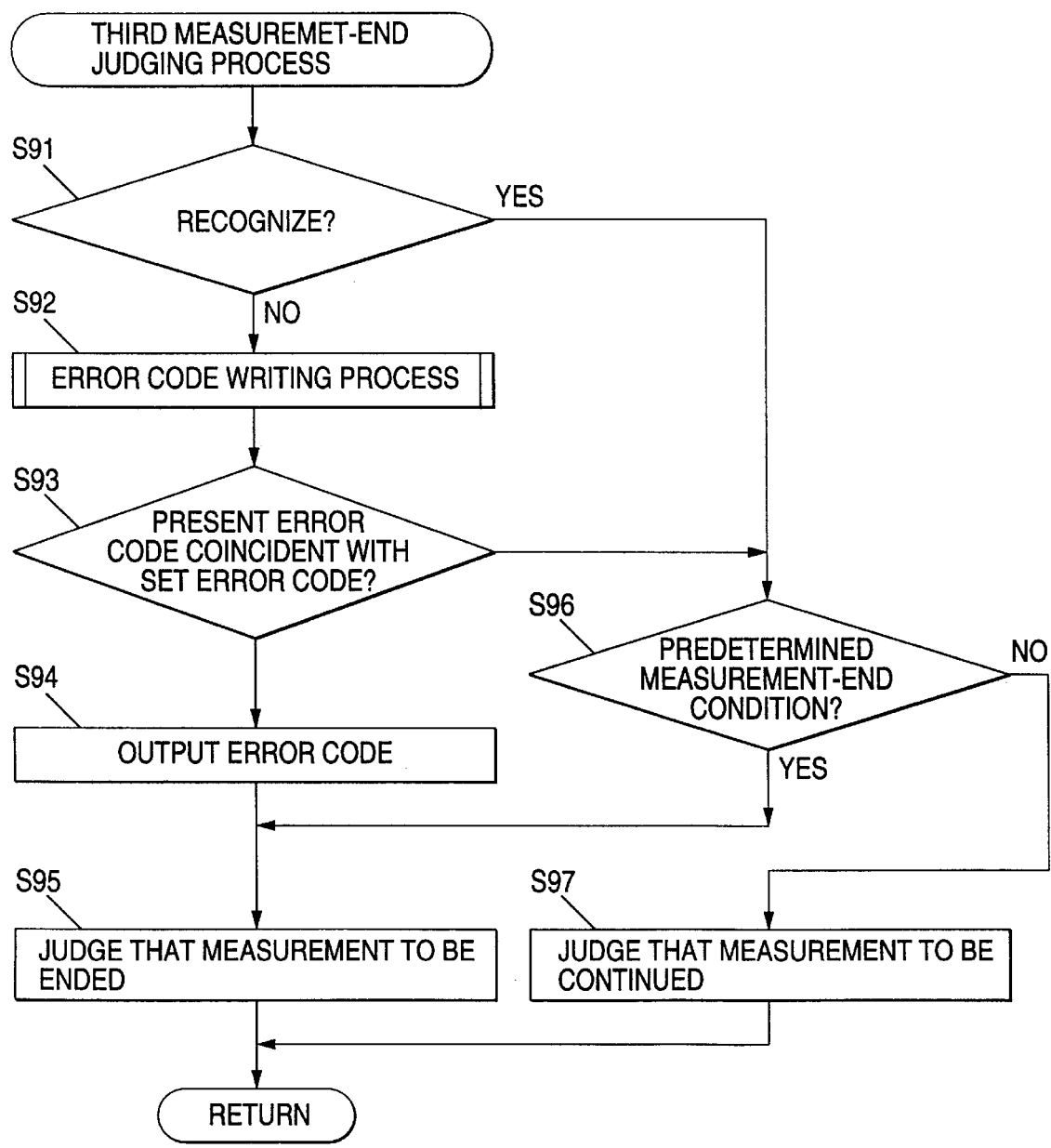
FIG. 9 is a flowchart showing a third measurement-end judging process in the error analyzing mode of FIG. 6.

An error analyzing mode in the bar code reading device according to the present embodiment will be described with reference to FIGS. 6 through 9. FIG. 6 is a flowchart showing the error analyzing mode. FIGS. 7 to 9 are flowcharts showing measurement-end judging processes in the error analyzing mode shown in FIG. 6.

To start, the control unit 5 determines whether or not a predetermined measurement start condition is satisfied (step S51 in FIG. 6). The predetermined measurement start condition is to receive a mode designating command indicative of the error analyzing mode through the communication unit 8 and to receive a timing signal TIM from exterior or to receive a measurement start command through the communication unit 8. If the measurement start condition is satisfied, a measurement starts as in the first normal measuring mode (step S52).

The control unit waits till the binary data of one scan is stored into the binary data storing area 41 of the storage unit 4 (step S53). Upon completion of the storing of the binary data of one scan, the decoding unit 6 analyzes the binary data that is stored in the binary data storing area 41, to thereby read bar code information. And it stores the read bar code information as present readout data into the present readout data storing area 42 (step S54).

Thereafter, the control unit carries out the measurement-end judging process shown in FIG. 7, 8 or 9 (step S55). The measurement-end judging process to be carried out is predetermined through the communication unit 8. If the measurement-end judging process judges that the measurement is to be continued (step S56), the control unit sets free the memory area from which the decoding unit 6 has analyzed the bar code information (step S57), and returns to the step S53. Then, it repeats the readout operation of the steps S53 to S57. If the measurement-end judging process judges that the measurement is to be ended (step S56), the measurement is ended as in the first normal measuring mode (step S58).

A first measurement-end judging process will be described with reference to FIG. 7. The control unit 5 determines whether or not the decoding unit 6 has recognized bar code information (step S61). If it has recognized the bar code information, the control unit compares the present readout data of the present readout data storing area 42 with the preceding readout data of the preceding readout data storing area 43 (step S62).

If the present readout data is not coincident with the preceding readout data, the present readout data is stored, as the preceding readout data, into the preceding readout data storing area 43 (step S63). The number of coincidences to be stored into the number-of-coincidences storing area 44 is set to "1" (step S64). If the present readout data is coincident with the preceding readout data, the number of coincidences to be stored into the number-of-coincidences storing area 44 is incremented by one (step S65).

If a predetermined measurement end condition is not satisfied (step S66), the control unit judges that the measurement is to be continued (step S71). If the predetermined measurement end condition is satisfied (step S66), the control unit judges that the measurement is to be ended (step S72). Here, the "predetermined measurement end condition" is to receive no timing signal TIM from exterior or to receive a measurement end command through the communication unit 8.

If the decoding unit 6 fails in recognizing the bar code information (step S61), the control unit carries out the error code writing process shown in FIG. 4 (step S67), and determines whether the number of coincidences stored in the number-of-coincidences storing area 44 is above or below a preset value, which is stored in the number-of-coincidences set value storing area 45 (step S68). If the number of coincidences is below the preset value, the control unit advances to the step S66. If the number of coincidences is above the preset value, the preceding readout data that is stored in the preceding readout data storing area 43 is outputted through the communication unit 8 (step S69), and a corresponding error code of the error codes that are stored in the error code storing area 47 is outputted (step S70). And the control unit judges that the measurement ends (step S72).

Thus, where the first measurement-end judging process is used, if the decoding unit fails in reading the bar code information after it read the bar code information at least a preset number of times, the measurement automatically ends. The bar code information that are already read, and an error code generated in the subsequent reading operation which failed to read the bar code information, are outputted. In this case, the binary data for which the bar code could not be read has been stored in the binary data storing area 41 at the end of the measurement. Therefore, a read error that occasionally occurs can be verified.

A second measurement-end judging process will be described with reference to FIG. 8. The control unit 5 determines whether or not the decoding unit 6 has recognized bar code information (step S81). If it has recognized the bar code information, the control unit determines whether or not the preceding readout data is present in the preceding readout data storing area 43 (step S82). If it is present, the control unit compares the present readout data of the present readout data storing area 42 with the preceding readout data of the preceding readout data storing area 43 (step S83).

If the present readout data is not coincident with the preceding readout data, the preceding readout data is outputted through the communication unit 8 (step S84), and the present readout data is outputted through the communication unit 8 (step S85). And the control unit judges that the measurement ends (step S86).

If the present readout data is coincident with the preceding readout data (step S83), the control unit judges if a predetermined measurement end condition is satisfied (step S87). Here, the "predetermined measurement end condition" is to receive no timing signal TIM from exterior or to receive a measurement end command through the communication unit 8. If the predetermined measurement end condition is satisfied, the control unit judges that the measurement is to be ended (step S86). If a predetermined measurement end condition is not satisfied, the control unit judges that the measurement is to be continued (step S88).

If the preceding readout data is not present (step S82), the control unit stores the present readout data as the preceding readout data into the preceding readout data storing area 43 (step S89), and advances to a step S87. If the bar code information is not recognized (step S81), the control unit carries out the error code writing process shown in FIG. 4 (step S90), and goes to the step S87.

Thus, where the second measurement-end judging process is used, if the bar code information currently read is different from the bar code information that was first read after the start of the measurement, the present readout data and the preceding readout data are outputted, and the measurement automatically ends. In this case, the binary data finally read has been stored in the binary data storing area 41 at the end of the measurement. Therefore, the read error data can be analyzed.

A third measurement-end judging process will be described with reference to FIG. 9. The control unit 5 determines whether or not the decoding unit 6 has recognized bar code information (step S91). If it has not recognized the bar code information, the control unit carries out the error code writing process shown in FIG. 4 (step S92), and compares the error code with a preset error code that is stored in the set error code storing area 48 (step S93).

If those error codes are coincident with each other, the corresponding error code is outputted through the communication unit 8 (step S94), and the control unit judges that the measurement ends (step S95).

If the corresponding error code is not coincident with the set error code (step S93), the control unit judges if a predetermined measurement end condition is satisfied (step S96).

Here, the "predetermined measurement end condition" is to receive no timing signal TIM from exterior or to receive a measurement end command through the communication unit 8.

If the predetermined measurement end condition is satisfied, the control unit judges that the measurement is to be ended (step S95). If a predetermined measurement end condition is not satisfied, the control unit judges that the measurement is to be continued (step S97). If it has recognized the bar code information (step S91), the control unit advances to the step S96.

Thus, where the third measurement-end judging process is used, if a preset read error occurs, the corresponding error code is outputted and the measurement automatically ends. In this case, the binary data incorrectly read has been stored in the binary data storing area 41 at the end of the measurement.

Therefore, it is possible to analyze the binary data of which the bar code could not be read for a specific reason.

Figure 10:
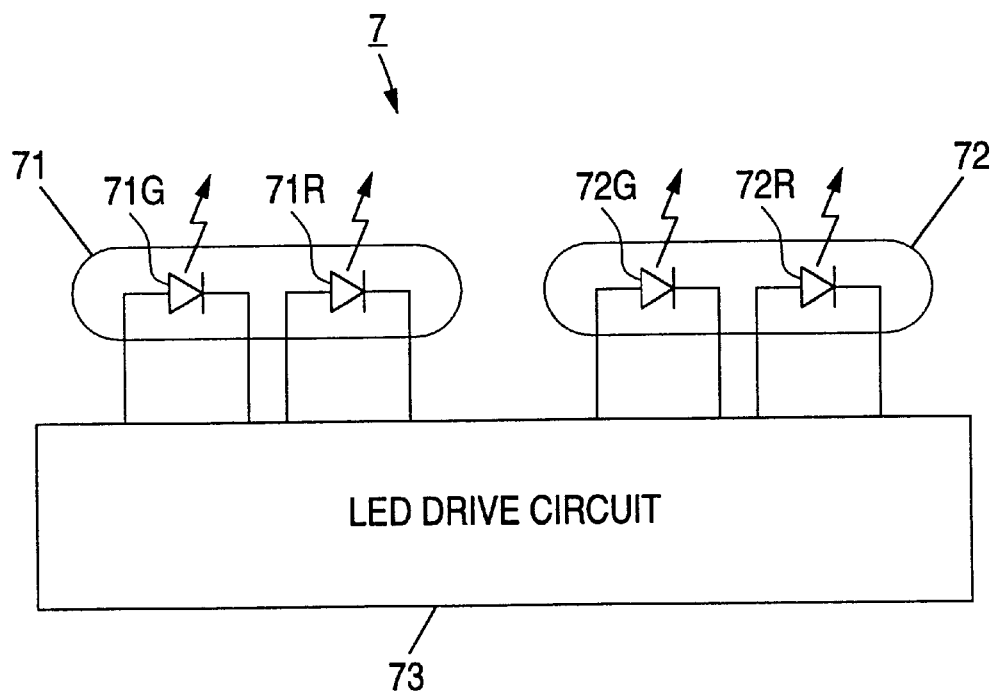
FIG. 10 shows an arrangement of an indicator unit in the bar code reading device of FIG. 1.

FIG. 10 is a diagram showing an arrangement of an indicator unit in the bar code reading device of FIG. 1. The indicator unit 7 in FIG. 10 includes a stable LED (light emission diode) indicator 71 consisting of LEDs (light emission diodes) of two colors, a read/nonread LED indicator 72, and a LED drive circuit 73.

The stable LED indicator 71 includes a green light emitting element 71G and a red light emitting element 71R. The read/nonread LED indicator 72 includes a green light emitting element 72G and a red light emitting element 72R. Under control of the control unit 5 shown in FIG. 1, the LED drive circuit 73 lights on and off the green light emitting element 71G and the red light emitting element 71R of the stable LED indicator 71, and the green light emitting element 72G and the red light emitting element 72R of the read/nonread LED indicator 72.

LED indications by the indicator unit 7 is used in a second normal measuring mode, a first test mode and a second test mode, which will be described hereunder.

Figure 11:
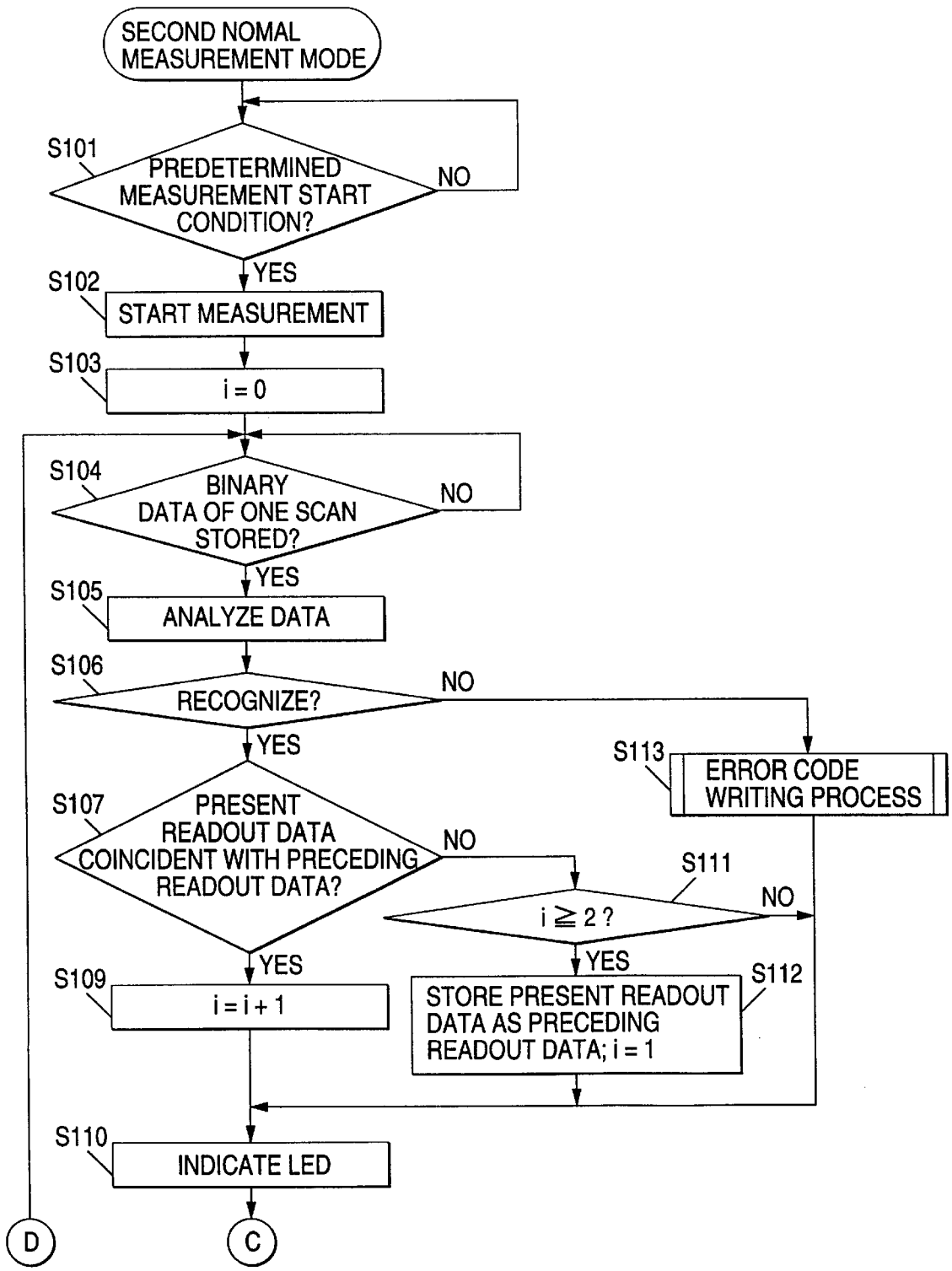
FIG. 11 is a partial flowchart showing a second normal measuring mode in the bar code reading device of FIG. 1.
Figure 12:
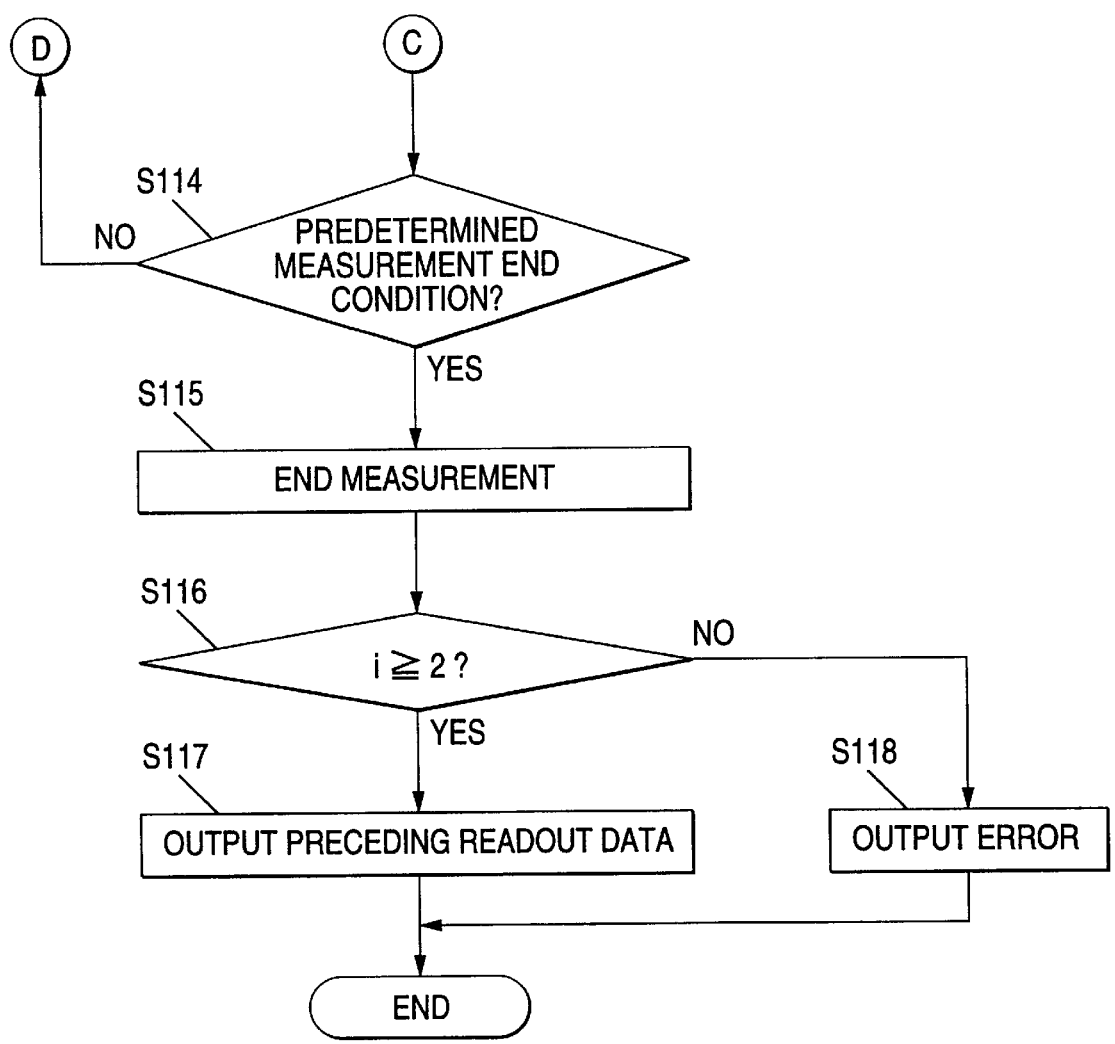
FIG. 12 is another partial flowchart showing the second normal measuring mode in the bar code reading device of FIG. 1.
Figure 13:
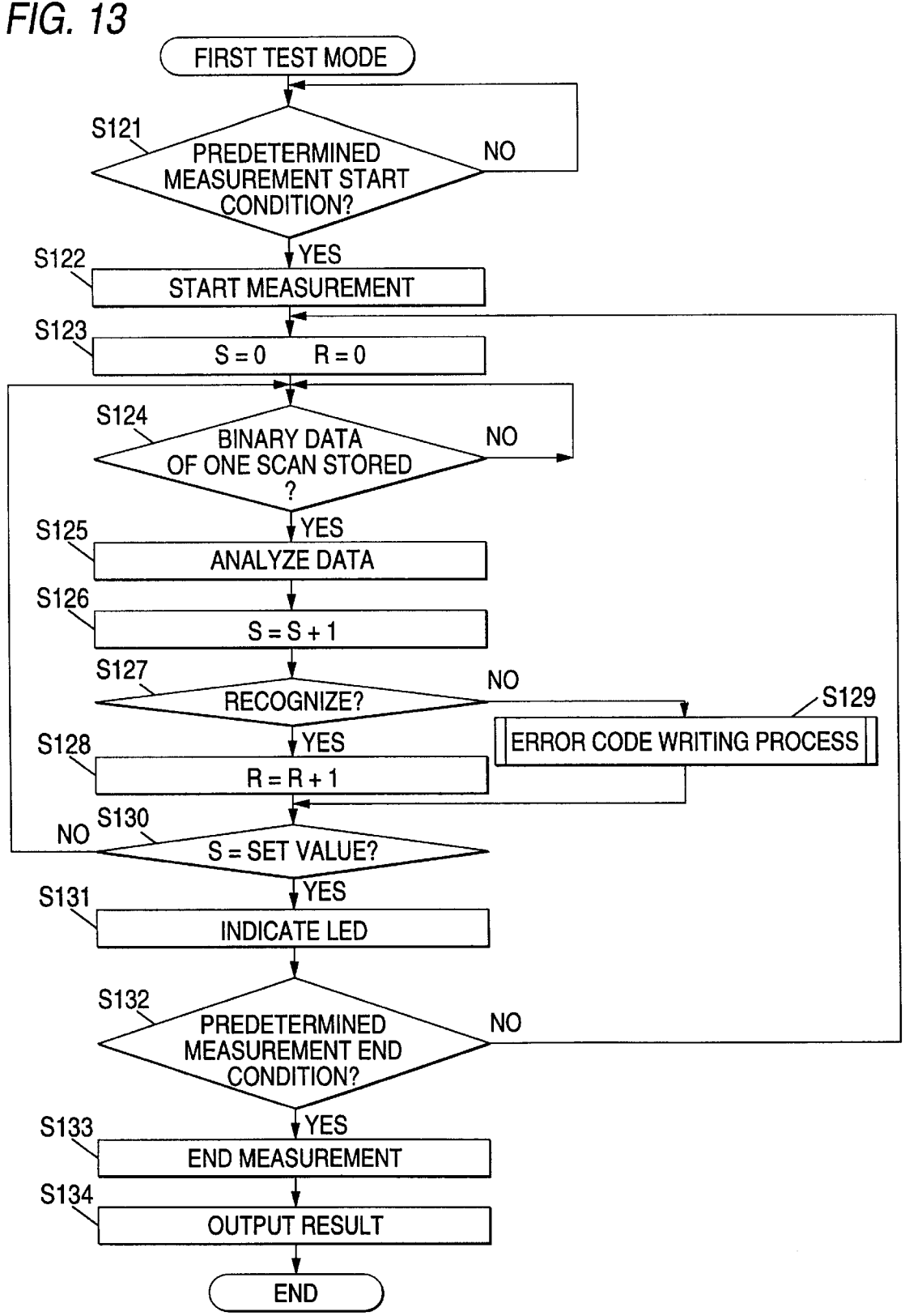
FIG. 13 is a flowchart showing a first test mode in the bar code reading device of FIG. 1.
Figure 14:
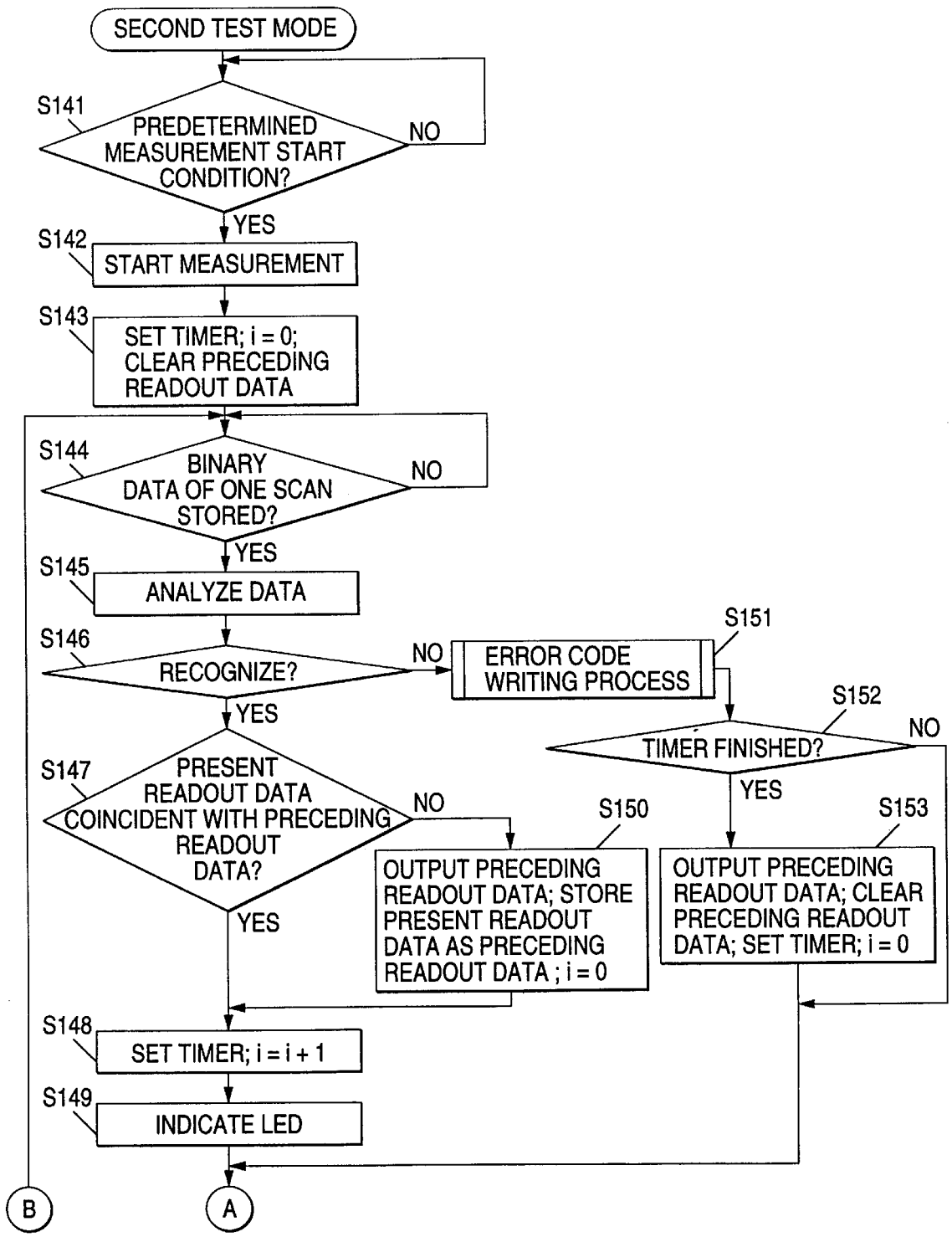
FIG. 14 is a partial flowchart showing a second test mode in the bar code reading device of FIG. 1.
Figure 15:
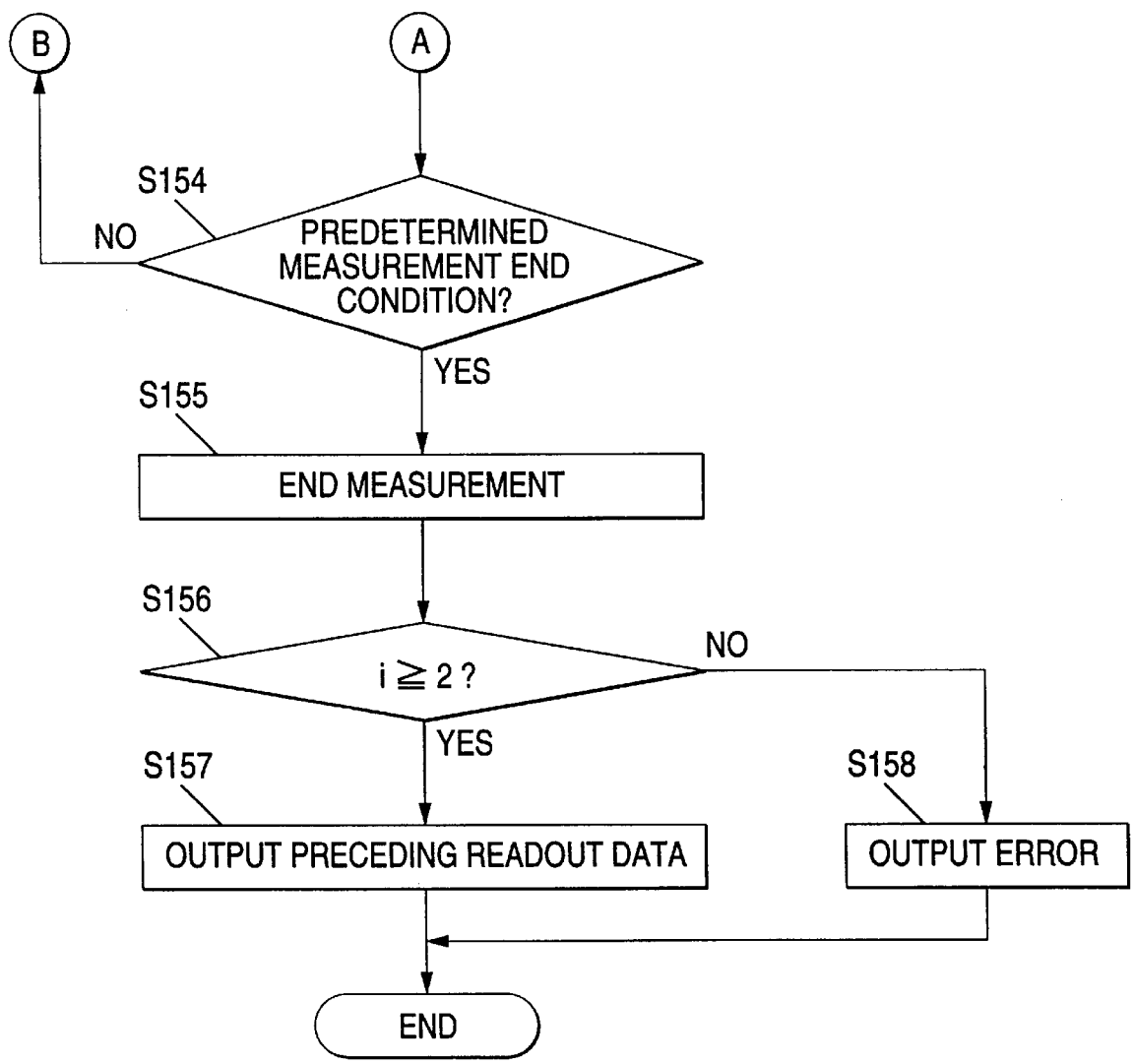
FIG. 15 another partial flowchart showing the second test mode in the bar code reading device of FIG. 1.

FIGS. 11 and 12 cooperate to form a flowchart showing the second normal measuring mode, FIG. 13 is a flowchart showing the first test mode, and FIGS. 14 and 15 cooperate to form a flowchart showing the second test mode.

The second normal measuring mode will be described with reference to FIG. 11. To start, the control unit 5 judges whether or not a predetermined measurement start condition is satisfied (step S101 in FIG. 11). Here, the predetermined measurement start condition is to receive a mode designating command indicative of a second normal measuring mode through the communication unit 8 and to receive a timing signal TIM from exterior or to receive a measurement start command through the communication unit 8. If the measurement start condition is satisfied, a measurement starts as in the first normal measuring mode (step S102). The number i of coincidences to be stored into the number-of-coincidences storing area 44 is set to "0" (step S103).

When the operation of storing the binary data of one scan into the binary data storing area 41 is completed (step S104), the decoding unit 6 analyzes the binary data and recognizes the bar code information thereof, and stores the read bar code information as the present readout data into the present readout data storing area 42 (step S105).

The control unit 5 determines whether or not the decoding unit 6 has recognized bar code information (step S106). If the bar code information is recognized, the control unit compares the present readout data of the present readout data storing area 42 with the preceding readout data of the preceding readout data storing area 43 (step S107). If the present readout data is coincident with the preceding readout data, the control unit increments by one the number i of coincidences to be stored into the number-of-coincidences storing area 44 (step S109), and drives the indicator unit to perform a LED indication associated therewith which will be described later (step S110).

If the present readout data is not coincident with the preceding readout data, the control unit determines whether or not the number i of coincidences to be stored into the number-of-coincidences storing area 44 is 2 or larger (step S111). If the number i of coincidences is 2 or larger, the control unit stores the present readout data as the preceding readout data into the preceding readout data storing area 43, and sets to "1" the number i of coincidences to be stored into the number-of-coincidences storing area 44 (step S112), and drives the display unit to perform a LED indication associated therewith (step S110).

If the bar code information is not recognized (step S106), the control unit carries out the error code writing process shown in FIG. 4 (step S113), and causes the display unit to perform a LED indication associated therewith (step S110).

Thereafter, the control unit judges if a predetermined measurement end condition is satisfied (step S114 in FIG. 12).

Here, the "predetermined measurement end condition" is to receive no timing signal TIM from exterior or to receive a measurement end command through the communication unit 8.

If a predetermined measurement end condition is not satisfied, the control unit returns to the step S104, and repeats the reading operation of the steps S104 to S113 and the LED indication.

If a predetermined measurement end condition is satisfied, the control unit ends the measurement as in the first normal measuring mode (step S115), and determines whether or not the number i of coincidences to be stored into the number-of-coincidences storing area 44 is 2 or larger (step S116).

If the number i of coincidences is 2 or larger, the preceding readout data is read from the preceding readout data storing area 43 and outputs it through the communication unit 8 (step S117). If the number i of coincidences is 1, an error signal is outputted through the communication unit 8 (step S118).

Thus, in the second normal measuring mode, the operation of reading the bar code information and the LED indication are repeated till the measurement of the bar code is forcibly ended.

The first test mode will be described with reference to FIG. 13. To start, the control unit 5 judges whether or not a predetermined measurement start condition is satisfied (step S121). Here, the predetermined measurement start condition is to receive a mode designating command indicative of a first test mode through the communication unit 8 and to receive a timing signal TIM from exterior or to receive a test start command through the communication unit 8.

If the measurement start condition is satisfied, a measurement starts as in the first normal measuring mode (step S122). The number S of scans to be stored in the number-of-scans storing area 51 and the number R of reading operations to be stored into the number-of-scans storing area 51 are initialized to "0" (step S123).

When the operation of storing the binary data of one scan into the binary data storing area 41 ends (step S124), the decoding unit 6 analyzes the binary data to recognize the bar code information thereof, and stores the recognized bar code information as the present readout data into the present readout data storing area 42 (step S125). Then, the number S of scans stored in the number-of-scans storing area 51 is incremented by one (step S126).

The control unit 5 judges whether or not the decoding unit 6 has recognized the bar code information (step S127). If it is recognized, the number R of reading operations to be stored into the number-of-readouts storing area 46 is incremented by one (step S128). If it is not recognized, the control unit carries out the error code writing process shown in FIG. 4 (step S129).

Then, the control unit judges whether or not the number S of scans to be stored in the number-of-scans storing are 51 reaches a set value stored in the number-of-scans set value storing area 52 (step S130).

If the number S of scans does not reach the set value, the control unit returns to the step S124, and repeats the sequence of the procedural steps S124 to S129. If the number S of scans reaches the set value, the indicator unit performs a LED indication to be described later (step S131). Then, the control unit judges whether or not a predetermined measurement end condition is satisfied (step S132). Here, the predetermined measurement end condition is to receive no timing signal TIM from exterior or to receive a test end command through the communication unit 8.

If the measurement end condition is not satisfied, the control unit returns to the step S123. If it is satisfied, the control unit ends the measurement as in the first normal measuring mode (step S133), and the result of the test is outputted through communication unit 8 (step S134). Here, the test result means a ratio of the number of reading operations to the number of scans, viz., a read rate.

As described above, in the first test mode, a read rate is measured and indicated with the LEDs.

The second test mode will be described with reference to FIGS. 14 and 15. To start, the control unit 5 judges whether or not a predetermined measurement start condition is satisfied (step S141 in FIG. 14). Here, the predetermined measurement start condition is to receive a mode designating command indicative of a second test mode through the communication unit 8 and to receive a timing signal TIM from exterior or to receive a test start command through communication unit 8.

If the measurement start condition is satisfied, the control unit stats a measurement as in the first normal measuring mode (step S142). Then, the control unit sets the timer, sets to "0" the number i of coincidences to be stored in the number-of-coincidences storing area 44, and clears the contents of the preceding readout data storing area 43 (step S143).

If the operation of storing binary data of one scan into the binary data storing area 41 ends (step S144), the decoding unit 6 analyzes the binary data to recognize the bar code information thereof, and stores the recognized bar code information as the present readout data into the present readout data storing area 42 (step S145).

The control unit 5 judges whether or not the decoding unit 6 has recognized bar code information (step S146). If it is recognized, the control unit compares the present readout data to be stored in the present readout data storing area 42 with the preceding readout data to be stored in the preceding readout data storing area 43 (step S147). If the present readout data is coincident with the preceding readout data, the control unit sets again the timer and increments by one the number i of coincidences to be stored in the number-of-coincidences storing area 44 (step S148), and performs a LED indication associated therewith to be described later (step S149).

If the present readout data is not coincident with the preceding readout data (step S147), the control unit outputs the preceding readout data through the communication unit 8, and stores the present readout data as the preceding readout data into the preceding readout data storing area 43. Further, it sets to "0" the number i of coincidences to be stored into the number-of-coincidences storing area 44 (step S150), and advances to a step S148.

When the bar code information is not recognized (step S146), the control unit carries out the error code writing process shown in FIG. 4 (step S151), and judges whether or not the operation of the timer ends (step S152). If the operation of the timer ends, the control unit outputs the preceding readout data to be stored in the preceding readout data storing area 43, through the communication unit 8, clears the contents of the preceding readout data storing area 43, sets the timer, and sets to "0" the number i of coincidences to be stored into the number-of-coincidences storing area 44 (step S153).

Thereafter, the control unit 5 judges whether or not a predetermined measurement end condition is satisfied (step S154 in FIG. 15). Here, the predetermined measurement end condition is to receive no timing signal TIM from exterior or to receive a test end command through communication unit 8. If the predetermined measurement end condition is satisfied, the control unit ends a measurement as in the second normal measuring mode (step S155). If the number i of coincidences stored in the number-of-coincidences storing area 44 is 2 or larger (step S156), the preceding readout data to be stored in the preceding readout data storing area 43 is outputted through the communication unit 8. If the number i of coincidences is 1 or 0 (step S155), a corresponding error code is outputted through the communication unit 8 (step S158).

Thus, in the second test mode, when the same bar code information as that previously read is read, a number of reading operations is added up (i.e., are totalized), and the result of the addition is indicated with the LEDs as will be described later. When a predetermined time has elapsed since the bar code information was not read, the bar code information finally read is outputted, and the number i of coincidences is initialized to "0".

The LED indications by the indicator unit 7 shown in FIG. 10 will be described.

In the second normal measuring mode, the LED drive circuit 73 lights on the stable LED indicator 71 as tabulated in Table 1.

TABLE 1

| Number of coincidences | Stable LED indicator |
|---|---|
| less than 5 times | Not lit on |
| less than 10 times | Red |
| less than 50 times | Orange (red/green lit on) |
| not less than 50 times | Green |

In Table 1, the number of coincidences indicates a value gained by adding up the number of coincidences when the same bar code information as that previously read is read.

When the number of coincidences is smaller than 5 times, neither the green light emitting element 71G or the red light emitting element 71R is not lit on in the stable LED indicator 71. When the number of coincidences is 5 times or larger but smaller than 10 times, the red light emitting element 71R is solely lit on. Accordingly, the stable LED indicator 71 emits red light. When the number of coincidences is 10 times or larger but smaller than 50 times, the red light emitting element 71R and the green light emitting element 71G are both lit on. Accordingly, the stable LED indicator 71 emits orange light. When the number of coincidences is 50 times or larger, the green light emitting element 71G is solely lit on. Accordingly, the stable LED indicator 71 emits green light.

In the first test mode, the LED drive circuit 73 lights on the stable LED indicator 71 and the read/nonread LED indicator 72 as tabulated in Table 2.

TABLE 2

| Read rate | Stable LED indicator | Read/nonread LED indicator |
|---|---|---|
| 0–19% | Not lit on | Green for read; Red for nonread |
| 20–49% | Red | Green |
| 50–79% | Orange (red/green lid on) | Green |
| 80–100% | Green | Green |

As shown in Table 2, when a read rate is within the range of 0 to 19%, the stable LED indicator 71 is not lit on. The LED emits red light for the read rates of 20 to 49%. The LED emits orange light for the read rates of 50 to 79%. The LED emits green light for the read rates of 80 to 100%. The read/nonread LED indicator 72 emits red light when the bar code information is not read, and emits green light when it is read.

In the second test mode, the LED drive circuit 73 lights on the stable LED indicator 71 and the read/nonread LED indicator 72 as tabulated in Table 3.

TABLE 3

| Number of coincidences | Stable LED indicator | Read/nonread LED indicator |
|---|---|---|
| less than 5 times | Not lit on | Green |
| less than 10 times | Red | (number-of-coincidences over set value) |
| less than 50 times | Orange (red/green lit on) | |
| not less than 50 times | Green | Red |

TABLE 3-continued

| Number of coincidences | Stable LED indicator | Read/nonread LED indicator |
|---|---|---|
| | | (number-of-coincidences under set value) |

In Table 3, the number of coincidences indicates a value gained by adding up the number of coincidences when the same bar code information as that previously read is read, as in Table 1.

As shown in Table 3, when the number of coincidences is smaller than 5 times, the stable LED indicator 71 is not lit on. When it is 5 times or larger but smaller than 10 times, the LED emits red light. When it is 10 times or larger but smaller than 50 times, the LED emits orange light. When it is 50 times or larger, the LED emits green light. The read/nonread LED indicator 72 emits green light when the number of coincidences is a preset value or larger, and emits red light when it is smaller than the preset value. When the number of reading operation is 0, neither the stable LED indicator 71 nor the read/nonread LED indicator 72 is lit on.

The indicator unit 7 of FIG. 10 indicates the number of reading operations and the read rate in four steps of different colors, which are generated by the LEDs of two colors. Therefore, an operator can easily and instantaneously know a change of a reading state at a distance from the indicator unit during the measurement of the bar code. The fact that those four steps are expressed with light of different colors emitted from the LEDs of two colors, implies that the indicator unit used may have a simple construction.

In the first invention, error information when the operation of reading bar code information fails is stored. Therefore, an operator can know the reason why the reading operation fails at any time.

In the two to sixth inventions, when the analysis result shows a predetermined error occurring state, the operation of reading the bar code information ends. At an arbitrary time after the measurement ends, one can know the reason for the failure of reading the bar code information by outputting the binary data that is stored in the data storing means, and analyzing the outputted data.

Particularly in the third invention, since an error occurring state can be set in advance, a preset error occurring state can be verified. In the fourth invention, when analyzing means fails in reading the bar code information after the bar code information is read a preset number of times or more, the reading operation ends. Therefore, a read error that occasionally occurs can be verified. In the fifth invention, when bar code information currently read is different from the bar code information first read after the measurement started, the reading operation ends. Therefore, erroneous read data can be analyzed. In the sixth invention, when a given error occurs, the reading operation ends. Therefore, a read error that will occur for a specific reason can be verified.

In the seventh to the ninth inventions, the read bar code information are totalized, and the result of the totalization is indicated in a plural number of steps of different light colors that are emitted from the LED indicators each containing a plural number of light emitting elements of different colors. Because of this, a reading state of the bar code information can recognized with a simple construction during the measurement of the bar code. Accordingly, an operator can easily know a moving rate of the bar code, and an installation state of the bar code reading device, such as a position and an inclination of the bar code reading device.

The eighth invention enables an operator to recognize a read rate by color changes of the LED indicators. The ninth invention enables an operator to recognize a number of the operations of reading bar code information by color changes of the LED indicators.

I claim:

1. A bar code reading device comprising:

light projecting means for projecting light on a bar code to be read out;

converting means for receiving light reflected from the bar code that is illuminated with light projected from said light projecting means and converting the reflected light into binary data;

data storing means for storing the binary data received from said converting means;

analyzing means for analyzing the binary data that is stored in said data storing means, and reading bar code information;

control means for controlling the operation of reading out the bar code information by said light projecting means, said converting means, said data storing means, and said analyzing means;

error information storing means for storing error information when said analyzing means fails in reading the bar code information; and output means for outputting error information that is stored in said error information storing means along with the binary data in which said analyzing means failed to read the bar code information.

2. A bar code reading device comprising:

light projecting means for projecting light on a bar code to be read out;

converting means for receiving light reflected from the bar code that is illuminated with light projected from said light projecting means and converting the reflected light into binary data;

data storing means for storing the binary data received from said converting means;

means for storing a plurality of predetermined error codes, and defining an error code storing area;

setting means for separately storing one of said plurality of predetermined error codes as a set error code, and defining a set error code storing area;

analyzing means for analyzing the binary data that is stored in said data storing means, and reading bar code information, wherein when said analyzing means cannot read said bar code information, said analyzing means selects a current error code from said plurality of predetermined error codes;

control means for repeating the operation of reading out the bar code information by said light projecting means, said converting means, said data storing means, and said analyzing means;

readout ending means for ending the operation of reading the bar code information when said analyzing means provides said current error code equal to said set error code in said set error code storing area; and output means for outputting the binary data that is related to the error occurring state, including said current error code, from said data storing means after a measurement ends.

3. The bar code reading device according to claim 2, wherein said error code storing means stores an error code corresponding to a state that said analyzing means cannot read said bar code information after said analyzing means reads said bar code information in a preset number of times and an error code corresponding to a state that said analyzing means read a current bar code information which is different from a first bar code information at starting reading.

4. A bar code reading device comprising:

light projecting means for projecting light on a bar code to be read out;

converting means for receiving light reflected from the bar code that is illuminated with light projected from said light projecting means and converting the reflected light into binary data;

data storing means for storing the binary data received from said converting means;

analyzing means for analyzing the binary data that is stored in said data storing means, and reading bar code information;

control means for repeating the operation of reading out the bar code information by said light projecting means, said converting means, said data storing means, and said analyzing means;

totalizing means for totalizing the bar code information read by said analyzing means; and indicating means for indicating the result of the totalizing of the bar code information by said totalizing means with LED indicators each containing a plural number of light emitting elements of different colors.

5. The bar code reading device according to claim 4, in which said totalizing means totalizes ratios of the reading of bar code information to a preset number of the reading operations, and said indicating means indicates said ratio in the combination of "on" and "off" of the light emitting elements of different colors.

6. The bar code reading device according to claim 4, in which said totalizing means totalizes the values indicative of the results each of adding up a number of the reading operations when the same bar code information as that previously read is read, and said indicating means indicates said values in the combination of "on" and "off" of the light emitting elements of different colors.

7. A bar code reading method comprising the steps of:

projecting light on a bar code to be read out;

receiving light reflected from the bar code that is illuminated with light projected from said light projecting step;

converting the reflected light into binary data;

storing the binary data into storing means thus converted;

analyzing the binary data that is stored in said data storing means;

reading bar code information from the binary data thus analyzed;

controlling said light projecting step, said converting step, said data storing step, said analyzing step, and said reading step;

storing error information when the bar code information fails to be read in said reading step; and outputting error information that is stored in said error information storing step along with the binary data for which the bar code information failed to be read.

8. A bar code reading method comprising the steps of:

storing a plurality of predetermined error codes in an error code storing area;

projecting light on a bar code to be read out;

receiving light reflected from the bar code that is illuminated with light projected from said light projecting step;

converting the reflected light into binary data;

storing the binary data thus converted, into data storing means;

analyzing the binary data that is stored in said data storing means, and reading bar code information, and when said bar code information cannot be read from said binary data, separately storing one of said plurality of predetermined error codes as a set error code in a set error code storing area;

repeating said projecting step, said receiving step, said converting step, and said data storing step;

repeating said analyzing step to read subsequent bar code information from said subsequent binary data, and when said subsequent bar code information cannot be read from said subsequent binary data, determining a current error code from said plurality of predetermined error codes;

ending the operation of reading the bar code information when said current error code is equal to said set error code in said set error code storing area; and outputting said subsequent binary data and said current error code after a measurement ends.

9. The bar code reading method according to claim 8, wherein said predetermined error codes stored in said error code storing area include an error code corresponding to a state that said analyzing means cannot read said bar code information after said analyzing means reads said bar code information in a preset number of times and an error code corresponding to a state that said analyzing means read a current bar code information which is different from a first bar code information at starting reading.

10. A bar code reading method comprising the steps of:

projecting light on a bar code to be read out;

receiving light reflected from the bar code that is illuminated with light projected from said light projecting step;

converting the reflected light into binary data;

storing the binary data thus converted, into storing means;

analyzing the binary data that is stored in said data storing means, and reading bar code information;

repeating said projecting step, said receiving step, said converting step, said data storing step, and said analyzing step;

totalizing the bar code information read in said analyzing step; and indicating the result of the totalizing of the bar code information by said totalizing step with LED indicators each containing a plural number of light emitting elements of different colors.

11. The bar code reading method according to claim 10, wherein said totalizing step totalizes ratios of the reading of bar code information to a preset number of the reading operations, and said indicating step indicates said ratio in the combination of "on" and "off" of the light emitting elements of different colors.

12. The bar code reading device according to claim 10, wherein said totalizing step totalizes the values indicative of the results each of adding up a number of the reading operations when the same bar code information as that previously read is read, and said indicating step indicates said values in the combination of "on" and "off" of the light emitting elements of different colors.

13. A computer-readable medium storing a bar code reading method comprising the steps of:

analyzing binary data stored in data storing means;

reading bar code information from the binary data thus analyzed;

controlling said analyzing step, and said reading step;

storing error information when the bar code information fails to be read in said reading step; and outputting error information that is stored in said error information storing step along with the binary data for which the bar code information failed to be read.

14. A computer-readable medium storing a bar code reading method comprising the steps of:

analyzing binary data that is stored in data storing means to produce bar code information, and, when said bar code information cannot be read from said binary data storing a related error code as a set error code;

analyzing subsequent binary data that is stored in said data storing means to produce subsequent bar code information, and, when said subsequent bar code information cannot be read from said subsequent binary data, determining a related error code as a current error code;

ending the operation of reading the bar code information when said current error code corresponds to said set error code; and outputting said current error code and said subsequent binary data after a measurement ends.

15. The computer-readable medium according to claim 14, wherein said set error code includes an error code corresponding to a state that said analyzing means cannot read said bar code information after said analyzing means reads said bar code information in a preset number of times and an error code corresponding to a state that said analyzing means read a current bar code information which is different from a first bar code information at starting reading.

16. A computer-readable medium storing a bar code reading method comprising the steps of:

analyzing binary data that is stored in data storing means, and reading bar code information;

repeating said analyzing step;

totalizing the bar code information read in said analyzing step; and indicating the result of the totalizing of the bar code information by said totalizing step with LED indicators each containing a plural number of light emitting elements of different colors.

17. The computer-readable medium according to claim 16, wherein said totalizing step totalizes ratios of the reading of bar code information to a preset number of the reading operations, and said indicating step indicates said ratio in the combination of "on" and "off" of the light emitting elements of different colors.

18. The computer-readable medium according to claim 16, wherein said totalizing step totalizes the values indicative of the results each of adding up a number of the reading operations when the same bar code information as that previously read is read, and said indicating step indicates said values in the combination of "on" and "off" of the light emitting elements of different colors.

* * * * *